United States Patent
Hayashi et al.

(10) Patent No.: US 6,758,765 B2
(45) Date of Patent: *Jul. 6, 2004

(54) MULTI-PIECE GOLF BALL

(75) Inventors: Junji Hayashi, Chichibu (JP); Hisashi Yamagishi, Chichibu (JP); Yasumasa Shimizu, Chichibu (JP); Yasushi Ichikawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/318,138

(22) Filed: Dec. 13, 2002

(65) Prior Publication Data
US 2003/0114253 A1 Jun. 19, 2003

(30) Foreign Application Priority Data
Dec. 17, 2001 (JP) .................................. 2001-383189

(51) Int. Cl.$^7$ .............................................. A63B 37/06
(52) U.S. Cl. ...................................................... 473/373
(58) Field of Search .............................. 473/351, 377, 473/378, 373, 374

(56) References Cited

U.S. PATENT DOCUMENTS

| | | |
|---|---|---|
| 5,553,852 A | 9/1996 | Higuchi et al. |
| 5,782,707 A | 7/1998 | Yamagishi et al. |
| 5,899,822 A | 5/1999 | Yamagishi et al. |
| 6,159,110 A | 12/2000 | Sullivan et al. |
| 6,162,134 A | 12/2000 | Sullivan et al. |
| 6,204,331 B1 | 3/2001 | Sullivan et al. |
| 2001/0011046 A1 | 8/2001 | Ichikawa et al. |

FOREIGN PATENT DOCUMENTS

| | | |
|---|---|---|
| JP | 07024085 A | 1/1995 |
| JP | 09239068 A | 9/1997 |
| JP | 10151226 A | 6/1998 |
| JP | 2001/170213 A | 6/2001 |

*Primary Examiner*—Raeann Gordon
(74) *Attorney, Agent, or Firm*—Sughrue Mion, PLLC

(57) ABSTRACT

A multi-piece golf ball includes a core having a diameter of 30 to 40 mm, at least one intermediate layer including the outermost layer having a thickness of 0.5 to 2.0 mm, and a cover having a thickness of 0.5 to 2.0 mm. The core is made from a rubber composition mainly containing polybutadiene. The outermost layer is made from a resin material containing an ionomer resin in an amount of 30% by weight or more. The cover is made from a material obtained by dispersedly blending at least one kind of silicone powder selected from a silicone rubber powder, a silicon resin powder, and a composite powder thereof, in a main resin component containing an ionomer resin in an amount of 50% by weight or more. The hardness of said cover is smaller than the hardness of said outermost layer of said at least one intermediate layer and is larger than the hardness of a center portion of said core. The multi-piece golf ball is excellent in resilience, durability, feel of hitting, and controllability.

10 Claims, 1 Drawing Sheet

MULTI-PIECE GOLF BALL

BACKGROUND OF THE INVENTION

The present invention relates to a multi-piece solid golf ball excellent in resilience, controllability, feel of hitting, and durability.

Golf balls have been requited to be excellent in resilience and thereby flight performance, feel of hitting upon shots, durability, and controllability, and to meet such requirements, various kinds of golf balls have been proposed, for example, in Japanese Patent Laid-open Nos. Hei 7-24085, Hei 9-239068, and Hei 10-151226.

The use of silicone materials for producing golf balls has been proposed, for example, in Japanese Patent Laid-open No. 2001-170213, and U.S. Pat. Nos. 6,159,110, 6,162,134, and 6,204,331. Such golf balls using silicon materials, however, have been recently required by golf players to be further improved in terms of resilience, feel of hitting, durability, and controllability.

SUMMARY OF THE INVENTION

In view of the foregoing, the present invention has been made, and an object of the present invention is to provide a multi-piece golf ball excellent in resilience and thereby flight performance, controllability, feel of hitting, and durability.

To achieve the above object of the present invention, according to an aspect of the present invention, there is provided a multi-piece golf ball including: a core having a diameter of 30 to 40 mm, the core being made from a rubber composition mainly containing polybutadiene; at least one intermediate layer including the outermost layer having a thickness of 0.5 to 2.0 mm, the outermost layer being made from a resin material containing an ionomer resin in an amount of 30% by weight or more; and a cover having a thickness of 0.5 to 2.0 mm, the cover being made from a material obtained by dispersedly blending at least one kind of silicone powder selected from a silicone rubber powder, a silicon resin powder, and a composite powder thereof, in a main resin component containing an ionomer resin in an amount of 50% by weight or more; wherein the hardness of the cover is smaller than the hardness of the outermost layer of the at least one intermediate layer and is larger than the hardness of a center portion of the core.

An average particle size of the silicon powder is preferably in a range of 0.5 to 700 μm.

The content of the silicon powder is preferably in a range of 0.5 to 20 parts by weight on the basis of 100 parts by weight of the main resin component.

The center portion of the core preferably has a Durometer D hardness in a range of 25 to 45.

The outermost layer of the at least one intermediate layer preferably has a Durometer D hardness in a range of 50 to 70.

The cover preferably has a Durometer D hardness in a range of 45 to 60.

At least one of the resin material forming the outermost layer of the at least one intermediate layer and the main resin component forming the cover preferably contains a thermoplastic elastomer having a crystalline polyethylene block.

At least one of the resin material forming the outermost layer of the at least one intermediate layer and the main resin component forming the cover preferably contains an ethylene-(meth)acrylic acid-acrylate copolymer.

The total thickness of the outermost layer of the at least one intermediate layer and the cover is preferably in a range of 1.2 to 3.8 mm.

At least one kind of silicon powder selected from a silicon rubber powder, a silicon resin powder, and a composite powder thereof is preferably dispersedly blended in the resin material forming the outermost layer of the at least one intermediate layer.

According to the golf ball of the present invention, since the silicone powder is dispersedly blended in the cover and further the at least one intermediate layer is harder than the cover and the core, it is possible to improve the resilience and thereby flight performance, and temperature dependency of the ball. In addition, since the two outer layers (the cover and the outermost layer of the at least one intermediate layer) are each formed from a material mainly containing an ionomer resin to thereby enhance adhesiveness between these outer layers, it is possible to reduce the energy loss, and since the cover is softer than the at least one intermediate layer, it is possible to significantly improve the durability against cracking upon shots. Also since the cover is softer than the at least one intermediate layer, it is possible to improve the spin characteristic of the golf ball, and since the core is relatively soft, it is possible to make deformation of the golf ball large and hence to improve the controllability of the golf ball. Further, since the cover is soft and the core is relatively soft, it is possible to ensure a soft feel of hitting the golf ball.

BRIEF DESCRIPTION OF THE DRAWINGS

The above aspects of the present invention will become more apparent by describing in detail non-limiting, illustrative embodiments thereof with reference to the attached drawing, in which.

DESCRIPTION OF THE PREFERRED EMBODIMENTS

Figure 1:
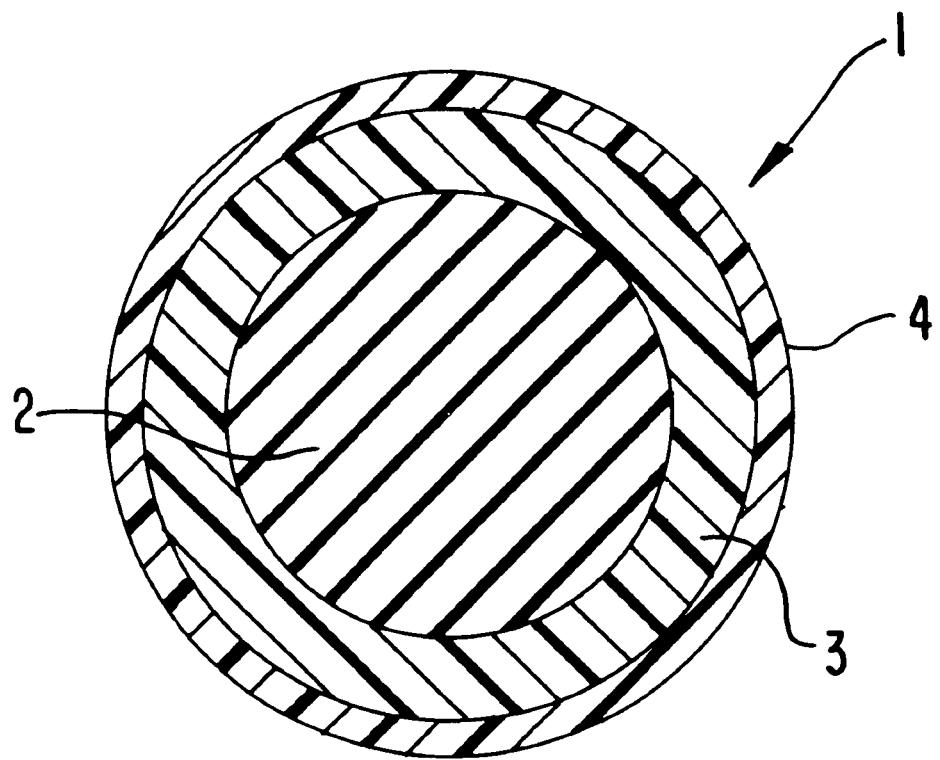
FIG. 1 is a cross-sectional view of a multi-layered golf ball of the present invention.

The present invention will be more fully described below.

The multi-piece golf ball 1 of the present invention includes a core 2, at least one intermediate layer 3, and a cover 4.

The core is formed from a rubber composition containing a main rubber component. The main rubber component mainly contains polybutadiene which preferably contains 40% or more, especially, 90% or more of cis-1,4-bonds. The main rubber component may contain, in addition to polybutadiene, a diene based rubber such as polyisoprene rubber, styrene-butadiene rubber, or natural rubber. The content of polybutadiene in the main rubber component is preferably in a range of 50% ("% by weight", the same applying correspondingly to the following) or more, especially, 70% or more.

The rubber composition used herein contains, in addition to the main rubber component, a crosslinking agent, preferably, in an amount of 15 to 40 parts ("parts by weight", the same applying correspondingly to the following) on the basis of 100 parts of the main rubber component. The crosslinking agent may be selected from zinc salts, magnesium salts, and other metal salts of unsaturated fatty acids such as zinc acrylate and zinc methacrylate, esters such as triethanolpropane methacrylate, and unsaturated fatty acids such as methacrylic acids.

The rubber composition may also contain an organic peroxide such as dicumyl peroxide, preferably, in an amount of 0.1 to 3 parts on the basis of 100 parts of the main rubber component. If necessary, the rubber composition may contain a vulcanizing agent such as an organic sulfur compound, for example, zinc salt of pentachlorothiophenol or diphenyldisulfide in an amount of 0.01 to 5 parts on the basis of 100 parts of the main rubber component.

The rubber composition may further contain, if needed, an antioxidant such as 2,2-methylene bis(4-methyl-6-tert-buthylphenol), and a filler for adjustment of a specific gravity, such as zinc oxide, barium sulfate, or calcium carbonate. The filler may be generally contained in the main rubber component in an amount of 130 parts or less on the basis of 100 parts of the main rubber component. In particular, to improve the resilience of the core, the filler may be contained in the main rubber component in an amount of, preferably, 50 parts or less, more preferably, 45 parts or less, especially, 40 parts or less on the basis of 100 parts of the main rubber component. The lower limit of the content of the filler may be set to 1 part or more, especially, 3 parts or more, and further, 20 parts or more.

The core can be prepared from the above-described rubber composition, for example, by kneading the components of the rubber composition in an ordinary kneader such as a Banbury mixer or a roll mill, and molding the resultant compound into a desired shape by a compression molding process or an injection molding process. In this molding process, vulcanization can be performed at a temperature of 130 to 180° C. for 10 to 60 min.

The Durometer D hardness of the core thus prepared is measured under JIS K-7215. It is to be noted that in this embodiment, the Durometer D hardness of each of the intermediate layer and the cover to be described later is also measured under JIS K-7215. The Durometer D hardness $H_{CC}$ of a center portion of the core may be in a range of 25 or more, preferably, 28 or more, more preferably, 30 or more, with the upper limit thereof being set to 45 or less, preferably, 43 or less, more preferably, 40 or less. The Durometer D hardness $H_{cs}$ of a surface portion of the core may be in a range 30 or more, preferably, 32 or more, more preferably, 35 or more, with the upper limit thereof being set to 55 or less, preferably, 53 or less, more preferably, 52 or less. In addition, the center hardness $H_{CC}$ and the surface hardness $H_{CS}$ of the core preferably satisfy a relation of $H_{CC} < H_{CS}$. Too soft a center hardness of the core tends to significantly reduce the resilience of the core and the durability of the core against cracking, whereas too hard a center hardness of the core tends to give a hard feel of hitting the ball, and to increase spin rates of the ball upon full-shots and thereby reduce a flight distance of the ball. On the other hand, too soft a surface hardness of the core tends to significantly reduce the resilience of the core and the durability of the core against cracking, whereas too hard a surface hardness of the core tends to give a hard feel of hitting the ball, and to increase spin rates of the ball upon full-shots and thereby reduce a flight distance of the ball.

In addition, the center hardness of the core is the value obtained by measuring the hardness of a point on the cross-section along which the core has been cut in half, and the surface hardness of the core is the value obtained by measuring the hardness of a point on the spherical surface of the core.

The diameter of the core may be in a range of 30 mm or more, preferably, 32 mm or more, more preferably, 35 mm or more, with the upper limit thereof being set to 40 mm or less, preferably, 39.5 mm or less, more preferably, 39 mm or less. Too small a diameter of the core tends to reduce the resilience of the core and give a hard feel of hitting the ball, whereas too large a diameter of the core tends to reduce the resilience of the core and the durability of the core against cracking.

The at least one intermediate layer, which may be only one layer, is formed around the core configured as described above. The outermost layer of the at least one intermediate layer (which becomes the intermediate layer itself, if the at least one intermediate layer is composed of only one layer) is formed from a resin component containing an ionomer resin in an amount of 30% or more, preferably, 35% or more, more preferably, 40% or more. Too small a content of the ionomer resin tends to reduce the resilience of the outermost layer and molding characteristics, and to lower adhesiveness with the cover and thereby reduce the durability of the outermost layer against cracking.

The resin component of the outermost layer of the at least one intermediate layer may also contain a thermoplastic elastomer having a crystalline polyethylene block in an amount of 50% or less, preferably, 45% or less, more preferably, 40% or less, with the lower limit thereof being set to 0, preferably, 3% or more, more preferably, 5% or more. The blend of the thermoplastic elastomer having a crystalline polyethylene block in the resin component is effective to improve the resilience of the outermost layer. An appropriate thermoplastic elastomer having a crystalline polyethylene block is commercially available, for example, as Dynaron from JSR Corporation.

To improve flowability and thereby facilitate injection molding, the resin component may also contain an ethylene-(meth)acrylic acid-acrylate copolymer in an amount of 3% or more, especially, 5% or more, with the upper limit thereof being set to 50% or less, especially, 45% or less. An appropriate ethylene-(meth)acrylic acid-acrylate copolymer is commercially available, for example, as Nucrel from DuPont-Mitsui Polychemicals Co., Ltd.

The outermost layer of the at least one intermediate layer should be hardest among the components of the golf ball. To be more specific, the Durometer D hardness $H_{MO}$ of the outermost layer of the at least one intermediate layer may be in a range of 50 or more, preferably, 53 or more, more preferably, 55 or more, with the upper limit thereof being set to 70 or less, preferably, 67 or less, more preferably, 65 or less, and may be further higher than the Durometer D hardness H of the cover to be described later by 3 or more, preferably, 5 or more, more preferably, 7 or more. To small a hardness of the outermost layer of the at least one intermediate layer tends to reduce the resilience of the outermost layer, whereas too large a hardness of the outermost layer tends to give a hard feel of hitting the ball. Meanwhile, too small a difference between the outermost layer of the at least one intermediate layer and the cover tends to reduce at least one of the ball characteristics, resilience, controllability, and feel of hitting.

If the at least one intermediate layer is composed of two or more layers, each of inner layers other than the outermost layer may be formed from the same material as that used for forming the outermost layer and may have the same hardness as that of the outermost layer. With respect to the hardnesses of the inner layers, however, it is more preferable that the innermost layer has a hardness higher than that of the surface portion of the core, and the remaining inner layers have hardnesses becoming gradually larger toward the outer side.

The thickness of the outermost layer of the at least one intermediate layer may be in a range of 0.5 mm or more, preferably, 0.6 mm or more, more preferably, 0.7 mm or more, with the upper limit thereof being set to 2.0 mm or less, preferably, 1.8 mm or less, more preferably, 1.6 mm or less. Too small a thickness of the outermost layer of the at least one intermediate layer tends to reduce the resilience and durability of the outermost layer, whereas too large a thickness of the outermost layer of the at least one intermediate layer tends to give a hard feel of hitting the ball.

The cover is formed from a material using a main resin component so as to cover the at least one intermediate layer. The main resin component may contain an ionomer resin in an amount of 50% or more, preferably, 55% or more, more preferably, 60% or more. Too small a content of the ionomer resin tends to reduce the resilience of the cover and molding characteristics, and to lower adhesiveness with the at least one intermediate layer to thereby reduce the durability of the cover.

Like the resin component used for forming the at least one intermediate layer, the main resin component used for forming the cover may contain a thermoplastic elastomer having a crystalline polyethylene block in an amount of 50% or less, preferably, 45% or less, more preferably, 40% or less, with the lower limit thereof being set to 0%, preferably, 3% or more, more preferably, 5% or more. The blend of the thermoplastic elastomer having a crystalline polyethylene block in the main resin component is effective to improve the resilience of the cover. An appropriate thermoplastic elastomer having a crystalline polyethylene block is commercially available, for example, as Dynaron from JSR Corporation.

To improve flowability and thereby facilitate injection molding, the main resin component may also contain an ethylene-(meth)acrylic acid-acrylate copolymer in an amount of 3% or more, especially, 5% or more, with the upper limit thereof being set to 50% or less, especially, 45% or less. An appropriate ethylene-(meth)acrylic acid-acrylate copolymer is commercially available, for example, as Nucrel from DuPont-Mitsui Polychemicals Co., Ltd.

As a feature of the present invention, a silicone powder is dispersedly blended in the cover by dispersedly blending at least one kind of silicone powder (which is a powder of previously hardened silicone) selected from a silicone rubber powder, a silicone resin powder, and a composite powder thereof in the material forming the cover.

An appropriate silicone rubber powder is exemplified by a fine powder having a highly polymerized three-dimensional structure, which is obtained by crosslinking linear dimethyl polysiloxane and/or methylphenyl polysiloxane added with 0.05 mole % or more of vinyl groups by using methyl hydrogen polysiloxane as a crosslinking agent, and a powder modified therefrom. In addition, the silicone rubber powder used herein is preferable to have a true specific gravity of about 0.97. Examples of such a silicone rubber powder include commercially available products such as KMP597, 598, 594, and 595 (spherical type) and X-52-875 (amorphous type) from Shin-Etsu Chemical Co., Ltd.

An appropriate silicone resin powder is exemplified by a fine powder of hardened polyorgano silsesquioxanes obtained by hardening siloxane bonds in a three-dimensional network expressed by a formula $(RSiO_{3/2})_n$, and a powder modified therefrom. In the formula, it is recommended that R be $CH_3$, $C_6H_5$, or a long-chain alkyl group. In addition, the silicone resin powder used herein is preferable to have a true specific gravity of about 1.3. Examples of such a silicone resin powder include commercially available products such as KMP590, X-52-1186, and X-52-854 (spherical type), and X-52-821, X-52-830, and X-52-831 (modified type, for example, modified with vinyl groups, epoxy groups, amino groups, and the like) produced by Shin-Etsu Chemical Co., Ltd.

An appropriate composite powder is exemplified by a powder obtained by covering the above silicone rubber powder with the above silicone resin, and a powder modified therefrom. In addition, the silicone composite powder used herein is preferable to have a true specific gravity of 1.0 to 0.98. Examples of such a silicone composite powder include commercially available products such as KMP600 and X-52-1139G produced by Shin-Etsu Chemical Co., Ltd.

The silicone powder used herein may be in the form of either amorphous particles or spherical particles, although the silicone powder in the form of spherical particles is preferred.

Either of the silicone powders is recommended to have an average particle size in a range of, generally, 0.5 $\mu$m or more, preferably, 1 $\mu$m or more, more preferably, 3 $\mu$m or more, with the upper limit thereof being set to 700 $\mu$m or less, preferably, 500 $\mu$m or less, more preferably, 100 $\mu$m or less. Too small an average particle size of the silicone powder tends to cause a large amount of scattering of the powder in the dispersion step, which is undesirable for production of the cover, whereas too large an average particle size of the silicone powder tends to degrade scattering of the silicon powder and thereby reduce the durability of the cover against repetitive shots.

The content of the silicone powder may be in a range of 0.5 part or more, preferably, 0.8 part or more, more preferably, 1 part or more on the basis of 100 parts of the main resin component, with the upper limit thereof being set to 20 parts or less, preferably, 15 parts or less, more preferably, 8 parts or less on the basis of 100 parts of the main resin component. Too small a content of the silicone powder fails to sufficiently achieve the effect of adding the silicone powder as the feature of the present invention, whereas too large a content of the silicone powder tends to cause a difficulty in uniform dispersion of the silicone powder, and thereby reduce the resilience of the cover and the durability of the cover against cracking.

The hardness of the cover is required to be, as described above, softer than the outermost layer of the at least one intermediate layer. To be more specific, the Durometer D hardness of the cover may be in a range of 45 or more, preferably, 48 or more, more preferably, 50 or more, with the upper limit thereof being set to 60 or less, preferably, 58 or less, more preferably, 56 or less, and may be further higher than the Durometer D hardness of the center portion of the core by 3 or more, preferably, 5 or more, more preferably, 7 or more. To small a hardness of the cover tends to reduce the resilience of the cover, whereas too large a hardness of the cover tends to reduce the controllability of the ball and give a hard feel of hitting the ball. When the cover is softer than the center portion of the core, or when a hardness difference between the cover and the center portion of the core is too small even if the cover is harder than the center portion of the core, at least one of the ball characteristics, resilience, feel of hitting, and controllability tends to be reduced.

The hardness of each of the at least one intermediate layer and the cover is the value obtained by measuring the hardness of a sheet formed from the same material as that of each the at least one intermediate layer and the cover under JIS K-7215.

The thickness of the cover may be in a range of 0.5 mm or more, preferably, 0.6 mm or more, more preferably, 0.7 mm or more, with the upper limit thereof being set to 2.0 mm or less, preferably, 1.8 mm or less, more preferably, 1.6 mm or less. Too small a thickness of the cover fails to keep a good durability of the cover and a pleasant feel of hitting the ball, whereas too large a thickness of the cover tends to reduce the resilience of the cover.

The total thickness of the cover and the outermost layer of the at least one intermediate layer (the outermost layer becomes the at least one intermediate layer itself, if the at least one intermediate layer is composed of only one layer) may be in a range of 1.2 mm or more, preferably, 1.4 mm or more, more preferably, 1.5 mm or more, with the upper limit thereof being set to 3.8 mm or less, preferably, 3.6 mm or less, more preferably, 3.5 mm or less. Too small a total thickness of the cover and the outermost layer of the at least one intermediate layer tends to reduce the resilience of the cover and the outermost layer and the durability thereof, whereas too large a total thickness tends to give a hard feel of hitting the ball.

The above-described silicone powder may be dispersedly blended in the outermost layer of the at least one intermediate layer, if needed.

The multi-piece golf ball of the present invention can be produced in accordance with a known method, and can be subjected to polishing, painting, and the like after formation of the cover in accordance with a known method.

Like conventional golf balls, the multi-piece golf ball of the present invention has, on its surface, a multiplicity of dimples. The geometrical arrangement of the dimples may be any of those known in the art, for example, an octahedral arrangement and an icosahedral arrangement, and a pattern of each of the dimples may be any of those known in the art, for example, a square pattern, a hexagonal pattern, a pentagonal pattern, and a triangular pattern.

The multi-piece golf ball of the present invention may be formed in accordance with the Rules of Golf, that is, with the diameter set to 42.67 mm or more and the weight set to 45.93 g or less.

The multi-piece golf ball of the present invention configured as described above is excellent in resilience, durability, feel of hitting, and controllability.

EXAMPLE

The present invention will be described in more detail with reference to the following examples and comparative examples, although not limited thereto.

Examples and Comparative Examples

In accordance with a known golf ball production process, multi-piece golf balls having dimensional and other characteristics shown in Table 3 were each produced by the steps of forming a core by using a material shown in Table 1, forming an intermediate layer around the core by using a material shown in Table 2, and forming a cover around the intermediate layer by using a material shown in Table 2.

Results of evaluating the characteristics of each of the multi-piece golf balls thus obtained are shown in Table 3.

TABLE 1

Composition of Material for Core (parts by weight)

| | Example | | | Comparative Example | | | | |
|---|---|---|---|---|---|---|---|---|
| | 1 | 2 | 3 | 1 | 2 | 3 | 4 | 5 |
| 1,4-polybutadiene (cis-structure) | 100 | 100 | 100 | 100 | 100 | 100 | 100 | 100 |
| Zinc acrylate | 21.0 | 23.0 | 23.0 | 21.0 | 23.0 | 23.0 | 24.0 | 28.9 |
| Dicumyl peroxide | 1.4 | 1.4 | 1.4 | 1.4 | 1.4 | 1.4 | 1.4 | 1.4 |
| Antioxidant | 0.1 | 0.1 | 0.1 | 0.1 | 0.1 | 0.1 | 0.1 | 0.1 |
| Zinc oxide | 31.3 | 30.6 | 30.6 | 31.3 | 30.6 | 30.6 | 24.7 | 20.4 |
| Zinc salt of pentachlorothiophenol | 0.2 | 0.2 | 0.2 | 0.2 | 0.2 | 0.2 | 0.2 | 0.2 |

TABLE 2

Compositions of Materials for Intermediate Layer and Cover (parts by weight)

| | Example | | | Comparative Example | | | | |
|---|---|---|---|---|---|---|---|---|
| | 1 | 2 | 3 | 1 | 2 | 3 | 4 | 5 |
| (material for intermediate layer) | | | | | | | | |
| Himilan 1706 | 50 | | | 50 | | | | |
| Himilan 1605 | 50 | | 35 | 50 | | | | |
| Himilan 1557 | | 52 | | | 52 | | | |
| Himilan 1601 | | 48 | | | 48 | | | |
| Surlyn 9945 | | | 35 | | | | | |
| Surlyn 7930 | | | | | | 60 | | |
| Surlyn AD8542 | | | | | | 35 | | |
| Dynaron 6100P | | | 30 | | | | | |
| Nucrel 9-1 | | | | | | 5 | | |
| Hytrel 4047 | | | | | | | 100 | |
| (material for cover) | | | | | | | | |
| Himilan 1706 | | | | | | | 48.5 | |
| Himilan 1605 | | | | | | | 48.5 | |
| Surlyn 7930 | 44.6 | | | 37 | 47 | 47 | | 37 |
| Surlyn 6320 | 36.6 | | | | 38.5 | 38.5 | | |
| Himilan AM7311 | | 28.5 | 29.1 | | | | | |
| Surlyn AD8542 | | 52.3 | 53.4 | 40 | | | | 40 |
| Nucrel AN4811 | | | | 23 | | | | 23 |
| Nucrel AN4318 | 13.8 | | | | 14.5 | 14.5 | | |
| Nucrel 1560 | | 14.2 | 14.5 | | | | | |
| KMP597 | 5 | 5 | 3 | | | | 3 | |

While not shown in Table 2, a UV absorber, an antioxidant, a dispersion auxiliary, and a coloring agent were suitably added to the materials shown in Table 2.

The terms "Surlyn", "Dynaron", "Himilan", "Nucrel", "Hytrel", and "KMP597" shown in Table 2 are the trade names of the commercially available products sold by the following makers:

Surlyn: EI DuPont de Nemours & Company

Dynaron: JSR Corporation

Himilan: DuPont-Mitsui Polychemicals Co., Ltd.

Nucrel: DuPont-Mitsui Polychemicals Co., Ltd.

Hytrel: DuPont-Toray Co., Ltd.

KMP597: silicone rubber powder (spherical type, average particle size: 5 μm), Shin-Etsu Chemical Co., Ltd.

TABLE 3

|  |  | Example | | | Comparative Example | | | | |
| --- | --- | --- | --- | --- | --- | --- | --- | --- | --- |
|  |  | 1 | 2 | 3 | 1 | 2 | 3 | 4 | 5 |
| Core | Outer diameter (mm) | 36.4 | 36.4 | 36.4 | 36.4 | 36.4 | 36.4 | 35.2 | 38.9 |
|  | Weight (g) | 30.6 | 30.6 | 30.6 | 30.6 | 30.6 | 30.6 | 27.0 | 36.0 |
|  | Center hardness (D) | 34 | 35 | 35 | 34 | 35 | 35 | 35 | 41 |
|  | Surface hardness (D) | 43 | 46 | 46 | 43 | 46 | 46 | 45 | 54 |
| Intermediate Layer | Thickness (mm) | 1.65 | 1.65 | 1.65 | 1.65 | 1.65 | 1.65 | 1.7 |  |
|  | Hardness (D) | 63 | 60 | 56 | 63 | 60 | 56 | 40 |  |
| Cover | Thickness (mm) | 1.5 | 1.5 | 1.5 | 1.5 | 1.5 | 1.5 | 2.05 | 1.9 |
|  | Hardness (D) | 50 | 52 | 53 | 51 | 53 | 53 | 60 | 51 |
| Product | Outer diameter (mm) | 42.7 | 42.7 | 42.7 | 42.7 | 42.7 | 42.7 | 42.7 | 42.7 |
|  | Weight (g) | 45.2 | 45.2 | 45.2 | 45.2 | 45.2 | 45.2 | 45.2 | 45.2 |
| Flight | Backspin (rpm) | 2610 | 2600 | 2560 | 2610 | 2590 | 2570 | 2410 | 2820 |
|  | Launch angle (degree) | 9.5 | 9.5 | 9.6 | 9.5 | 9.5 | 9.6 | 9.8 | 9.3 |
|  | Flight distance (m) | 246.0 | 247.0 | 247.5 | 243.5 | 245.0 | 244.0 | 247.0 | 242.5 |
|  | Initial velocity (m/s) at 23° C. | 72.6 | 72.7 | 72.6 | 72.1 | 72.2 | 71.8 | 72.4 | 72.3 |
|  | Initial velocity (m/s) at 0° C. | 71.8 | 71.9 | 71.8 | 70.9 | 71.0 | 70.6 | 71.6 | 71.1 |
| Controllability | Backspin (rpm) | 5610 | 5530 | 5510 | 5620 | 5520 | 5500 | 5060 | 5630 |
| Feel of Hitting | Driver/approach | O/O | O/O | O/O | O/O | O/O | O/O | O/X | X/O |
| Durability |  | O | O | O | O | O | O | X | O |

The hardness and thickness of each of the core, intermediate layer, and cover, and ball characteristics shown in Table 3 were determined as follows:

Hardness of Core

The surface hardness of the core was determined by directly measuring the hardness of a point on the surface of the core by a Durometer D hardness meter, and the center hardness of the core was determined by cutting the core in half, polishing the cut plane to eliminate irregularities thereon, and measuring a point on the cut plane by the Durometer D hardness meter.

Outer Diameter of Core

The outer diameter of the core was determined by measuring outer diameters of 5 points on the surface of the core and averaging the measured values.

Outer Diameter of Intermediate Layer

The outer diameter of the intermediate layer was determined by measuring outer diameters of five points on the surface of the intermediate layer and averaging the measured values.

Thickness of Intermediate Layer

The thickness of the intermediate layer was determined by an expression of (outer diameter of intermediate layer−outer diameter of core)÷2.

Hardness of Intermediate Layer

The hardness of the intermediate layer was determined by preparing a sheet made from the same material as that of the intermediate layer and measuring the hardness of the sheet by the Durometer D hardness meter.

Outer Diameter of Ball Product

The outer diameter of the ball product was determined by measuring the outer diameters of five points on land portions (with no dimples) of the ball product and averaging the measured values.

Hardness of Cover

The hardness of the cover was determined by preparing a sheet made from the same material as that of the cover and measuring the hardness of the sheet by the Durometer D hardness meter.

Thickness of Cover

The thickness of the cover was determined by an expression of (outer diameter of ball product−outer diameter of intermediate layer)÷2. It is to be noted that if the multi-piece golf ball is a two-piece golf ball, the thickness of the cover is specified by an expression of (outer diameter of ball product−outer diameter of core)÷2.

Flight Performance

The flight performance was evaluated from results of a test performed using a hitting machine (club: driver, head speed: 50 m/s). In this test, the spin rate, initial speed at each of 23° C. and 0° C., launch angle were measured by using a high-speed camera.

Controllability

The controllability of the golf ball was evaluated from results of a test using a hitting machine (club: sand wedge, head speed: 20 m/s). In this test, the spin rate was measured by using a high-speed camera.

Feel of Hitting

The feel of hitting the golf ball was evaluated from results of a test performed by hitting the ball with a driver by each of five top amateur players.

O: soft

X: hard

Durability

The durability of the golf ball against cracking was evaluated from results of a test performed by repeatedly hitting the ball at a head speed of 40 m/s. In this test, five balls were hit for each kind of the golf balls prepared in Examples and Comparative Examples.

The evaluation was made in comparison with the durability of a general three-piece golf ball (commercially available under the trade name of ALTUS NEWING from Bridgestone Sports Co., Ltd.).

O: superior to NEWING

X: inferior to NEWING

From the results shown in Table 3, the following becomes apparent.

Comparative Example 1

Since the hardness of each layer of the golf ball in Comparative Example 1 is the same as that of each layer of the golf ball in Example 1, the feel of hitting and the durability against cracking of the golf ball in Comparative Example 1 are comparable to those of the golf ball in Example 1. On the other hand, in the golf ball in Comparative Example 1, when compared with the golf ball in Example 1, the resilience of each of the cover and accordingly the resilience of the ball is poor, to reduce the flight distance of the golf ball, and further the temperature dependency of the golf ball is poor.

Comparative Example 2

Since the hardness of each layer of the golf ball in Comparative Example 2 is the same as that of each layer of the golf ball in Example 2, the feel of hitting and the durability against cracking of the golf ball in Comparative Example 2 are comparable to those of the golf ball in Example 2. On the other hand, in the golf ball in Comparative Example 2, when compared with the golf ball in Example 2, the resilience of the cover and accordingly the resilience of the ball is poor, to reduce the flight distance of the golf ball, and further the temperature dependency of the golf ball is poor.

Comparative Example 3

Since the hardness of each layer of the golf ball in Comparative Example 3 is the same as that of each layer of the golf ball in Example 3, the feel of hitting and the durability against cracking of the golf ball in Comparative Example 3 are comparable to those of the golf ball in Example 3. On the other hand, in the golf ball in Comparative Example 3, when compared with the golf ball in Example 3, the resilience of each of the cover and the intermediate layer and accordingly the resilience of the ball is poor, to reduce the flight distance of the golf ball, and further the temperature dependency of the golf ball is poor.

Comparative Example 4

Since the golf ball in Comparative Example 4 is specified, like the golf ball similar to that disclosed in Japanese Patent Laid-open No. 2001-170213, such that the materials of the intermediate layer and the cover are different from each other (intermediate layer: polyester, cover: ionomer), the adhesive force between the intermediate layer and the cover is small, with a result that the golf ball in Comparative Example 4 is inferior to the golf ball in each of Examples 1, 2 and 3 in terms of resilience of the ball and durability of the ball against cracking. Further, since the cover is harder, the controllability of the golf ball is poor.

Comparative Example 5

The golf ball in Comparative Example 5 is a general spin type two-piece golf ball, and is inferior to the golf ball in each of Examples 1, 2 and 3 in terms of flight distance due to a large spin rate, and further the golf ball in Comparative Example 5 gives a hard feel when hit with a driver.

On the contrary, the golf ball in each of Examples 1, 2 and 3 exhibits good flight performance, feel of hitting, and durability.

While the preferred embodiment and examples of the present invention have been described using specific terms, such description is for illustrative purposes only, and it is to be understood that changes and modifications may be made without departing from the spirit and scope of the following claims.

What is claimed is:

1. A multi-piece golf ball comprising:

a core having a diameter of 30 to 40 mm, said core being made from a rubber composition mainly containing polybutadiene;

at least one intermediate layer including the outermost layer having a thickness of 0.5 to 2.0 mm, said outermost layer being made from a resin material containing an ionomer resin in an amount of 30% by weight or more; and a cover having a thickness of 0.5 to 2.0 mm, said cover being made from a material obtained by dispersedly blending at least one kind of silicone powder selected from a silicone rubber powder, a silicon resin powder, and a composite powder thereof, in a main resin component containing an ionomer resin in an amount of 50% by weight or more;

wherein the hardness of said cover is smaller than the hardness of said outermost layer of said at least one intermediate layer and is larger than the hardness of a center portion of said core, and wherein the center portion of said core has a Durometer D hardness in a range of 25 to 45 and a surface portion of said core has a Durometer D hardness in a range of 30 to 55 which is larger than the center portion of said core.

2. A multi-piece golf ball according to claim 1, wherein an average particle size of said silicon powder is in a range of 0.5 to 700 $\mu$m.

3. A multi-piece golf ball according to claim 1, wherein the content of said silicon powder is in a range of 0.5 to 20 parts by weight on the basis of 100 parts by weight of said main resin component.

4. A multi-piece golf ball according to claim 1, wherein said outermost layer of said at least one intermediate layer has a Durometer D hardness in a range of 50 to 70.

5. A multi-piece golf ball according to claim 1, wherein said cover has a Durometer D hardness in a range of 45 to 60.

6. A multi-piece golf ball according to claim 1, wherein at least one of the resin material forming said outermost layer of said at least one intermediate layer and the main resin component forming said cover contains a thermoplastic elastomer having a crystalline polyethylene block.

7. A multi-piece golf ball according to claim 1, wherein at least one of the resin material forming said outermost layer of said at least one intermediate layer and the main resin component forming said cover contains an ethylene-(meth) acrylic acid-acrylate copolymer.

8. A multi-piece golf ball according to claim 1, wherein the total thickness of said outermost layer of said at least one intermediate layer and said cover is in a range of 1.2 to 3.8 mm.

9. A multi-piece golf ball according to claim 1, wherein at least one kind of silicon powder selected from a silicon rubber powder, a silicon resin powder, and a composite powder thereof is dispersedly blended in the resin material forming said outermost layer of said at least one intermediate layer.

10. A multi-piece golf ball according to claim 1, wherein the hardness of said cover is larger than the hardness of the center portion of said core by three or more in a Durometer D hardness.

* * * * *